United States Patent
Min et al.

(10) Patent No.: US 11,075,907 B2
(45) Date of Patent: Jul. 27, 2021

(54) END-TO-END SECURITY COMMUNICATION METHOD BASED ON MAC PROTOCOL USING SOFTWARE DEFINED-NETWORKING, AND COMMUNICATION CONTROLLER AND COMPUTER PROGRAM FOR THE SAME

(71) Applicant: Korea University Research and Business Foundation, Seoul (KR)

(72) Inventors: Sung-Gi Min, Seoul (KR); Ju-Ho Choi, Seoul (KR); Junghwan Cha, Seoul (KR); Hyeon-Ki Yun, Seoul (KR); Il-Woong Kim, Yongin-si (KR); Taeyoon Kim, Seoul (KR); Seung Hoon Lee, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 271 days.

(21) Appl. No.: 16/170,373

(22) Filed: Oct. 25, 2018

(65) Prior Publication Data

US 2019/0190910 A1 Jun. 20, 2019

(30) Foreign Application Priority Data

Dec. 20, 2017 (KR) .................... 10-2017-0176096
Jan. 25, 2018 (KR) .................... 10-2018-0009171

(51) Int. Cl.
*H04L 29/06* (2006.01)
*H04L 12/701* (2013.01)
(Continued)

(52) U.S. Cl.
CPC ...... *H04L 63/0876* (2013.01); *H04L 12/4633* (2013.01); *H04L 45/00* (2013.01);
(Continued)

(58) Field of Classification Search
CPC ..... H04L 63/08; H04L 63/02; H04L 63/0428; H04L 9/3242; H04L 63/0876;
(Continued)

(56) References Cited

U.S. PATENT DOCUMENTS 9,038,151 B1 * 5/2015 Chua .................. H04L 45/28
726/6
9,077,701 B2 * 7/2015 Sun .................... G06F 21/44
(Continued)

FOREIGN PATENT DOCUMENTS

KR 10-2010-0092768 A 8/2010
KR 10-2014-0051802 A 5/2014
(Continued)

OTHER PUBLICATIONS

Korean Office Action dated Sep. 4, 2019 in connection with counterpart Korean Patent Application No. 10-2018-0009171, citing the above references.

*Primary Examiner* — Oleg Korsak
*Assistant Examiner* — Feliciano S Mejia
(74) *Attorney, Agent, or Firm* — Hauptman Ham, LLP (57) ABSTRACT

An end-to-end security communication method includes, when receiving a security key generation request packet from a first host, generating, by a communication controller, a security key for end-to-end security communication between the first host and a second host, transmitting the generated security key to each of the first host and the second host, and setting a forwarding rule for transmission of a packet destined for a Media Access Control (MAC) address of the first host or a MAC address of the second host to a first switch and a second switch connected respectively to the first host and the second host. According to the (Continued)

end-to-end security communication method, the communication controller performs the process of generating a security key that will be shared between hosts using Software Defined-Networking (SDN), so that MAC security communication technology can be applied to communication between hosts belonging to different networks.

10 Claims, 6 Drawing Sheets

(51) Int. Cl.
  *H04L 12/46* (2006.01)
  *H04L 12/721* (2013.01)
(52) U.S. Cl.
  CPC ............ *H04L 45/38* (2013.01); *H04L 63/062* (2013.01); *H04L 63/10* (2013.01); *H04L 63/162* (2013.01)
(58) Field of Classification Search
  CPC . H04L 9/3273; H04L 9/0838; H04L 63/0869; H04L 63/20; H04L 63/062; H04L 63/162; H04L 61/6022; H04L 12/4633; H04L 45/00; H04L 45/38; H04L 63/10
  See application file for complete search history.

(56) References Cited

U.S. PATENT DOCUMENTS

| | | | | |
|---|---|---|---|---|
| 9,667,485 | B2* | 5/2017 | Murphy | H04L 41/12 |
| 10,257,161 | B2* | 4/2019 | L. | H04L 63/00 |
| 10,397,221 | B2* | 8/2019 | Mohamed | H04L 63/062 |
| 10,454,887 | B2* | 10/2019 | Weis | H04L 63/123 |
| 10,469,461 | B1* | 11/2019 | Singh | H04L 63/029 |
| 10,686,595 | B2* | 6/2020 | Chimakurthy | H04L 63/0869 |
| 10,708,245 | B2* | 7/2020 | Sankaran | H04L 63/0272 |
| 10,868,697 | B2* | 12/2020 | Gao | H04L 69/22 |
| 2006/0182124 | A1* | 8/2006 | Cole | H04L 63/0428 |
| | | | | 370/395.54 |
| 2009/0150665 | A1* | 6/2009 | Kaippallimalil | H04L 9/0847 |
| | | | | 713/153 |
| 2013/0305332 | A1* | 11/2013 | Narasimhan | H04W 12/082 |
| | | | | 726/7 |
| 2016/0036813 | A1* | 2/2016 | Wakumoto | H04L 63/0272 |
| | | | | 713/171 |
| 2019/0191307 | A1* | 6/2019 | Sheng | H04W 12/04031 |
| 2019/0281031 | A1* | 9/2019 | Pothula | H04L 63/10 |
| 2020/0067889 | A1* | 2/2020 | Pillai | H04L 63/20 |

FOREIGN PATENT DOCUMENTS

| | | |
|---|---|---|
| KR | 10-2017-0012161 A | 2/2017 |
| KR | 10-2017-0014852 A | 2/2017 |

* cited by examiner

END-TO-END SECURITY COMMUNICATION METHOD BASED ON MAC PROTOCOL USING SOFTWARE DEFINED-NETWORKING, AND COMMUNICATION CONTROLLER AND COMPUTER PROGRAM FOR THE SAME

CROSS-REFERENCE TO RELATED APPLICATIONS

This application claims priority under 35 U.S.C. § 119 to Korean Patent Application No. 10-2017-0176096, filed on Dec. 20, 2017 and Korean Patent Application No. 10-2018-0009171, filed on Jan. 25, 2018, in the Korean Intellectual Property Office, the disclosure of which is incorporated herein by reference in its entirety.

TECHNICAL FIELD

The present disclosure relates to an end-to-end security communication method based on Media Access Control (MAC) protocol using Software Defined-Networking (SDN) and a communication controller and a computer program for the same, and more particularly, to technology for enabling security communication between end terminals on network at MAC layer level.

BACKGROUND

Media Access Control (MAC) security communication technology, so-called MACsec, provides encryption functions at layer 2 and is the international standard based on the communication protocol defined in IEEE 802.1AE. In many cases, earlier network security technologies act at layer 3 like IP security communication technology (or IPsec). However, recently, with the rapidly increasing and more complex traffic, there is an increasing interest in the function of protecting all traffic rather than securing particular applications or protocols, and to keep up with this trend, MAC security communication technology that can protect all traffic in layer 2 has emerged.

In the conventional MAC security technology, a group of nodes on the same wired network generate security keys and communicate with each other, and accordingly, security communication can be only enabled between nodes on the same network.

Figure 1:
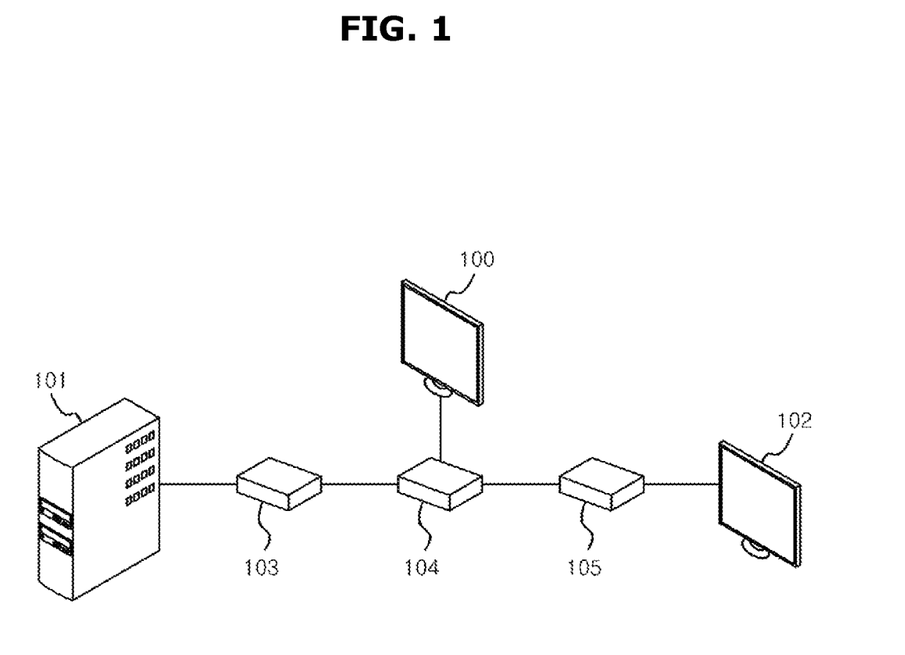
FIG. 1 is a conceptual diagram illustrating the process for transmission of a data packet between end terminals in conventional Media Access Control (MAC) security communication method.

FIG. 1 is a conceptual diagram illustrating the process for transmission of a data packet between end terminals in the conventional MAC security communication method.

Referring to FIG. 1, one host 101 is connected to other host 102 via one or more switches 103, 104, 105, allowing communication. The switches 103, 104, 105 are an open virtual switch for connecting a device such as the hosts 101, 102 or a network analyzer 100 to a network. In this instance, for MAC security communication between the hosts 101, 102 belonging to different networks, it is necessary to encrypt and decrypt a message being transmitted each time the message passes through each switch 103, 104, 105.

That is, in the conventional MAC security communication, a security key for security communication of the host 101 and the switch 103, a security key for security communication of the switch 103 and the switch 104, a security key for security communication of the switch 104 and the switch 105, and a security key for security communication of the switch 105 and the host 102 are each generated separately. When the host 101 encrypts and transmits a data packet using the security key the host 101 shares with the switch 103, the switches 104, 105 other than the switch 103 cannot know the destination of the packet. Accordingly, only after the switch 103 decrypts data first and re-encrypts the data packet using the security key the switch 103 shares with the switch 104, the switch 103 transmits the data packet to the switch 104. It is because the purpose of the MAC security standard itself is to provide security on the same Local Area Network (LAN). Subsequently, the same decryption and re-encryption process is equally performed between the switch 104 and the switch 105, and finally, the switch 105 encrypts the data packet using the security key the switch 105 shares with the host 102 and transmits it to the host 102.

Accordingly, the conventional MAC security communication method involves encryption and decryption of the data packet, each four times, even in the simple topology shown in FIG. 1, and in case that the MAC security communication method is applied to a larger area network, there is a problem with a huge waste of resources.

RELATED LITERATURES

Patent Literatures (Patent Literature 1) KR 2010-0092768 A

SUMMARY

Accordingly, the present disclosure is designed to solve the above-described problem, and an object of the present disclosure is to provide an end-to-end security communication method in which a communication controller performs a process of generating a security key that will be shared between hosts using Software Defined-Networking (SDN), so that Media Access Control (MAC) security communication technology can be applied to communication between hosts belonging to different networks.

Another object of the present disclosure is to provide a communication controller configured to perform the end-to-end security communication method.

Still another object of the present disclosure is to provide a computer program stored on a computer-readable recording medium to perform the end-to-end security communication method.

To achieve the above-described objects of the present disclosure, an end-to-end security communication method according to an embodiment includes performing, by a communication controller, authentication of a first host and a second host, receiving, by the communication controller, a security key generation request packet including a MAC address of the first host from the second host, transmitting, by the communication controller, the security key generation request packet to the first host, generating, by the communication controller, a security key for end-to-end security communication between the first host and the second host when receiving the security key generation request packet from the first host, transmitting, by the communication controller, the generated security key to each of the first host and the second host, and setting, by the communication controller, a forwarding rule for transmission of a packet destined for the MAC address of the first host or MAC address of the second host to a first switch and a second switch connected respectively to the first host and the second host.

In an embodiment of the present disclosure, the performing authentication of the first host and the second host may include performing, by the communication controller, authentication of the first host, receiving, by the communication controller, an authentication request of the second host after authenticating the first host, and transmitting, by the communication controller, a success packet and the MAC address of the first host to the second host when authentication of the second host is succeeded.

In an embodiment of the present disclosure, the end-to-end security communication method may further include performing, by the communication controller, authentication of at least one third host, and transmitting, by the communication controller, a MAC address of the third host to each of the first host and the second host when authentication of the third host is succeeded.

In an embodiment of the present disclosure, the setting the forwarding rule may include setting, by the communication controller, the forwarding rule of the first switch to transmit a packet whose source is the MAC address of the first host and destination is the MAC address of the second host directly to the second switch.

In an embodiment of the present disclosure, the setting the forwarding rule may include setting, by the communication controller, the forwarding rule of the second switch to transmit a packet whose source is the MAC address of the second host and destination is the MAC address of the first host directly to the first switch.

To achieve the above-described objects of the present disclosure, a communication controller according to another embodiment includes an authentication unit configured to perform authentication of at least one host by communicating with an authentication server, a policy database which stores a MAC address of the host authenticated by the authentication unit, a key generation unit configured to receive a security key generation request packet including a MAC address of a first host from a second host, transmit the security key generation request packet to the first host, and generate a security key for end-to-end security communication between the first host and the second host and transmit it to each of the first host and the second host when receiving the security key generation request packet from the first host, and a forwarding rule setting unit configured to set a forwarding rule for transmission of a packet destined for the MAC address of the first host or MAC address of the second host to a first switch and a second switch connected respectively to the first host and the second host.

In an embodiment of the present disclosure, the policy database may include the MAC address of the first host, and the authentication unit may receive an authentication request of the second host, and transmit a success packet and the MAC address of the first host to the second host when authentication of the second host is succeeded.

In an embodiment of the present disclosure, the authentication unit may perform authentication of at least one third host, and transmit a MAC address of the third host to each of the first host and the second host when authentication of the third host is succeeded.

In an embodiment of the present disclosure, the forwarding rule setting unit may set the forwarding rule of the first switch to transmit a packet whose source is the MAC address of the first host and destination is the MAC address of the second host directly to the second switch.

In an embodiment of the present disclosure, the forwarding rule setting unit may set the forwarding rule of the second switch to transmit a packet whose source is the MAC address of the second host and destination is the MAC address of the first host directly to the first switch.

To achieve the above-described objects of the present disclosure, a computer program according to still another embodiment is stored on a computer-readable recording medium to perform, in combination with a communication controller, the steps of performing authentication of a first host and a second host, receiving a security key generation request packet including a MAC address of the first host from the second host, transmitting the security key generation request packet to the first host, generating a security key for end-to-end security communication between the first host and the second host when receiving the security key generation request packet from the first host, transmitting the generated security key to each of the first host and the second host, and setting a forwarding rule for transmission of a packet destined for the MAC address the first host or MAC address of the second host to a first switch and a second switch connected respectively to the first host and the second host.

The end-to-end security communication method according to an aspect of the present disclosure can greatly extend the area of security communication as opposed to the conventional MAC security communication method, and thus it has applications in various fields, for example, automobile Ethernet or Internet of Things (IoT) environments. Automobile Ethernet devices or IoT devices are difficult to use the conventional layer 3 security technique such as IP security communication technology due to the limitation of performance and it is necessary to apply the layer 2 security technique, but MAC security communication technology as an alternative to the conventional layer 2 security has a limitation of small coverage because it has difficulty in applying to hosts on different networks. In this instance, using the end-to-end security communication method according to an aspect of the present disclosure, there is an advantage that an extension of MAC security communication technique to different networks will increase the possibility that security technology can be used in automobile Ethernet or small scale IoT networks.

DETAILED DESCRIPTION OF EMBODIMENTS

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment can be embodied in other embodiment without departing from the spirit and scope of the present disclosure. It should be further understood that changes can be made to locations or arrangements of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects Hereinafter, preferred embodiments of the present disclosure will be described in more detail with reference to the accompanying drawings.

Figure 2:
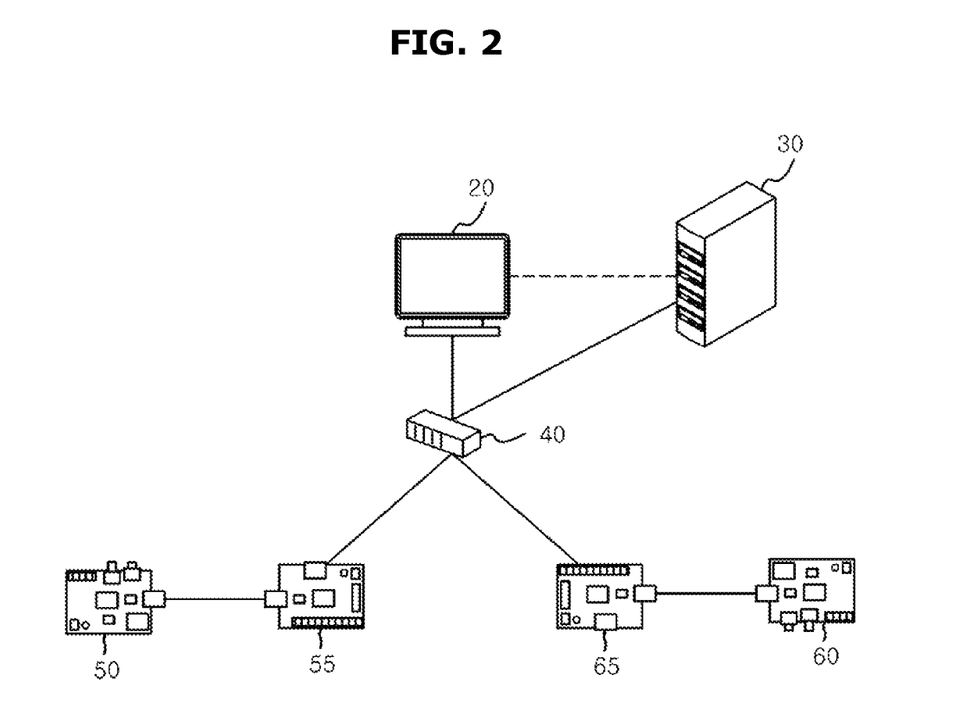
FIG. 2 is a conceptual diagram of network topology including a communication controller for performing an end-to-end security communication method according to an embodiment of the present disclosure.

FIG. 2 is a conceptual diagram of network topology including a communication controller for performing an end-to-end security communication method according to an embodiment of the present disclosure.

Referring to FIG. 2, the communication controller 20 according to an embodiment is configured to operate in communication with an authentication server 30 and at least one host 50, 60. The hosts 50, 60 may be a server, a workstation or a user terminal that transmits and receives a data packet via a network, and they are not limited to a particular type. Each host 50, 60 is connected to the communication controller 20 and the authentication server 30 through its corresponding switch 55, 65, allowing communication. The switches 55, 65 may be an open virtual switch for connecting a device such as the hosts 50, 60 to the network. Additionally, the communication controller 20 may be connected to the hosts 50, 60 through at least one router 40, for example, a broadband router, allowing communication.

The authentication server 30 may be an AAA framework having authentication, authorization and accounting functions for the user name, password and authority of each host 50, 60 to enable security communication via a network. For example, the authentication server 30 may include an AA framework based on Remote Access Dial-In User Service (RADIUS) protocol, but is not limited thereto.

The communication controller 20 is configured to authenticate at least one host 50, 60 through communication with the authentication server 30. The authentication process through communication with the authentication server 30, performed by the communication controller 20, may adopt the procedure of IEEE 802.1X standard which is the conventional Media Access Control (MAC) security communication standard.

Additionally, using Software Defined-Networking (SDN) in communication between the authenticated first host 50 and second host 60, the communication controller 20 functions to generate a security key that will be shared between each host 50, 60 and transmit it to each host 50, 60, while hiding the fact that each host 50, 60 belongs to different networks. Using SDN by the communication controller 20, MAC security can be applied to end-to-end communication between the first host 50 and the second host 60.

Figure 3:
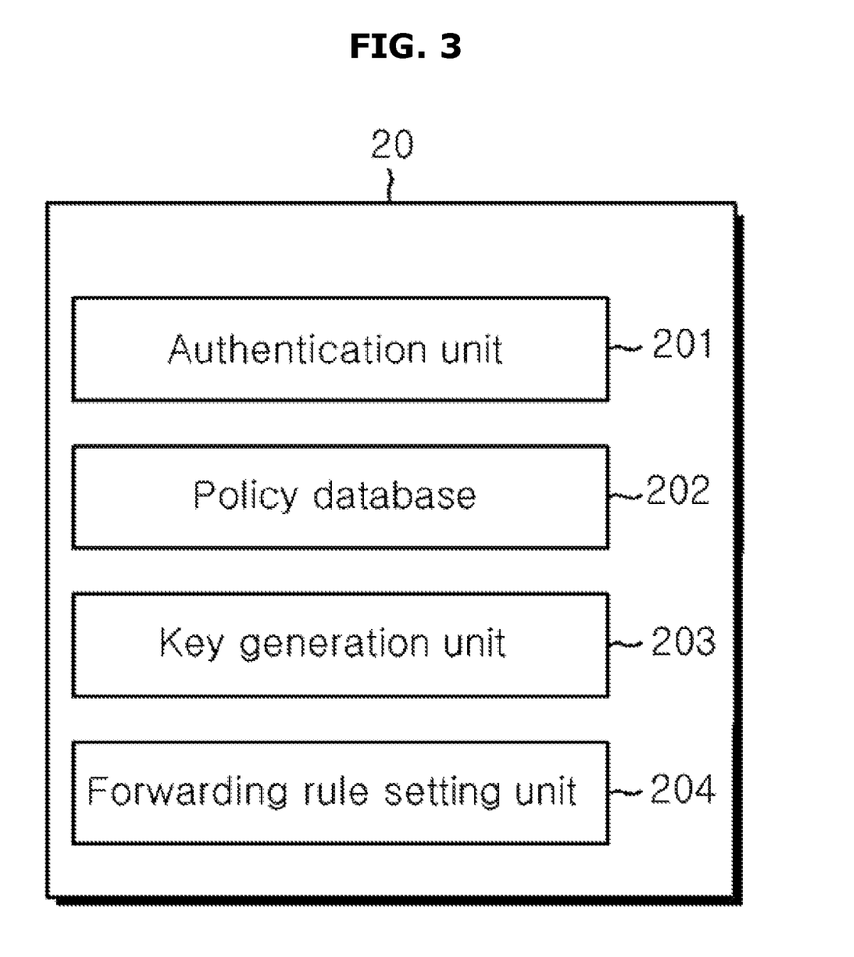
FIG. 3 is a block diagram of a communication controller according to an embodiment of the present disclosure.

FIG. 3 is a block diagram of the communication controller 20 shown in FIG. 2.

Referring to FIG. 3, in an embodiment, the communication controller 20 includes an authentication unit 201, a policy database 202, a key generation unit 203 and a forwarding rule setting unit 204. The communication controller 20 according to the embodiments and each unit 201-204 included therein may have aspects of entirely hardware, or partly hardware and partly software. Additionally, each unit 201-204 that constitutes the communication controller 20 is not necessarily intended to refer to separate devices that are physically distinguished from each other. That is, the authentication unit 201, the policy database 202, the key generation unit 203 and the forwarding rule setting unit 204 shown in FIG. 3 are only functionally divided according to the operation performed by hardware and software that constitute the communication controller 20, and each unit is not necessarily provided independently of each other.

The authentication unit 201 is configured to authenticate the first host 50 and the second host 60 by communicating with the authentication server 30. Additionally, the authentication unit 201 may perform an authentication process of at least one other host (referred to as a third host) not shown in the drawing. The specific authentication process will be described in detail with reference to FIG. 6 below.

The policy database 202 stores MAC addresses of one or more hosts authenticated by the authentication unit 201. The MAC addresses of the authenticated hosts, stored in the policy database 202, may be transmitted to existing authenticated hosts in the form of a peer list, when any other additional host is authenticated by the authentication unit 201.

When a security key generation request packet for establishing a security key with a particular host (for example, the first host 50) having a MAC address stored in the policy database 202 is received from other host (for example, the second host 60), the key generation unit 203 may generate a security key that will be shared between the first host 50 and the second host 60. Additionally, the key generation unit 203 may transmit the generated security key to each of the first host 50 and the second host 60.

The forwarding rule setting unit 204 functions to set forwarding rules of the first switch 55 connected to the first host 50 and the second switch 65 connected to the second host 60, to allow the first host 50 and the second host 60 sharing the security key to communicate each other using a data packet encrypted with the security key. The forwarding rule setting unit 204 may generate or overwrite forwarding rules of the first switch 55 and the second host 60 by generating forwarding rules and transmitting them to the first switch 55 and the second host 60, so that a data packet transmitted between the first host 50 and the second host 60 can be directly transmitted to the destination with no need to pass through a node, for example, another switch.

Hereinafter, for convenience of description, the end-to-end security communication method according to the embodiments will be described with reference to the network topology of FIG. 2 and the block diagram of the communication controller of FIG. 3.

Figure 4:
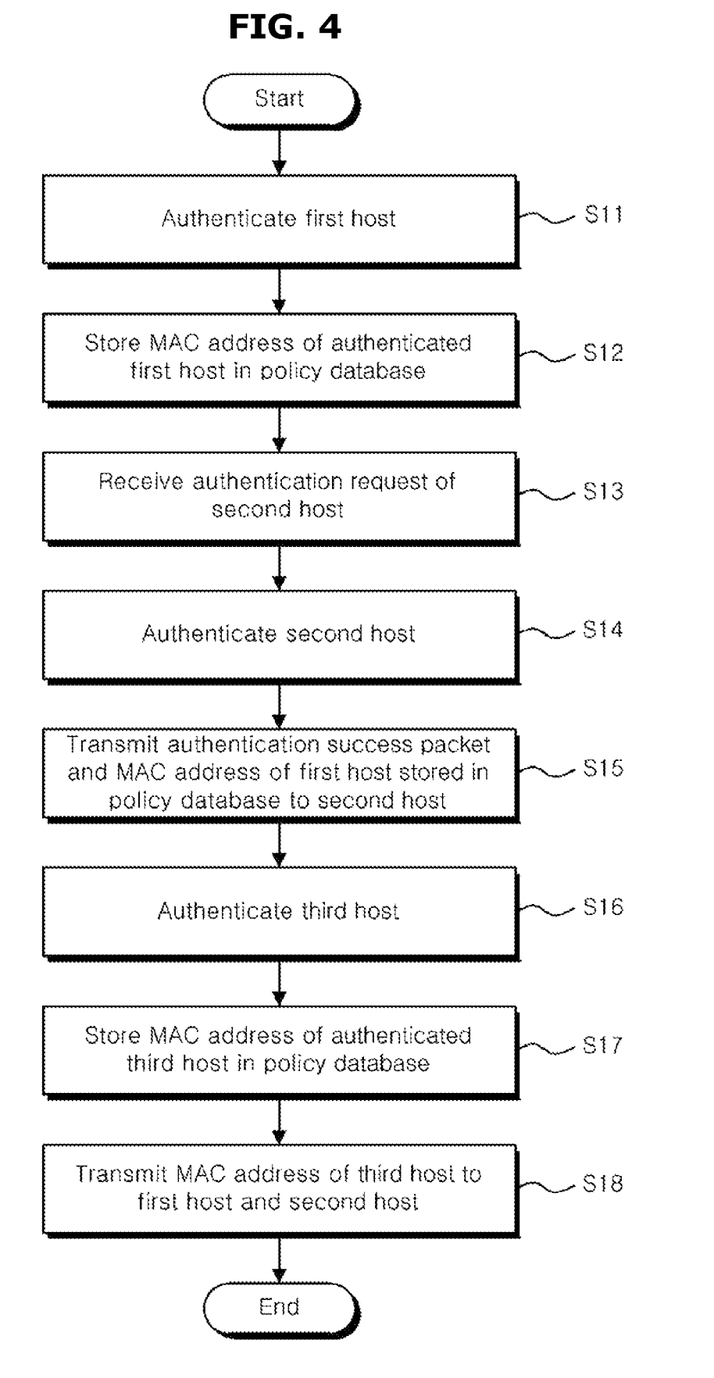
FIG. 4 is a flowchart showing each step of a peer list sharing process in an end-to-end security communication method according to an embodiment of the present disclosure.

FIG. 4 is a flowchart showing each step of the peer list sharing process in the end-to-end security communication method according to an embodiment of the present disclosure.

Referring to FIG. 4, first, the communication controller 20 may authenticate the first host 50 (S11), and store the MAC address of the authenticated first host 50 in the policy database 202 of the communication controller 20 (S12). The authentication process by the communication controller 20 may be performed involving communication with the authentication server 30, and the specific authentication procedure will be described in detail with reference to FIG. 6 below.

When the first host 50 is authenticated as described above and an authentication request is received from the unauthenticated second host 60 (S13), the communication controller 20 authenticates the second host 60 in the same way as authentication of the first host 50 (S14). When authentication of the second host 60 is succeeded, the communication controller 20 transmits a success packet of authentication to the second host 60, and at the same time, transmits the MAC address of the first host 50 stored in the policy database 202 (S15). The transmitted MAC address is used in a security key generation request packet when the second host 60 intends to establish a security key with the first host 50, and it will be described in detail with reference to FIG. 5 below.

In an embodiment, each time authentication of an additional host is succeeded, the communication controller 20 transmits a potential peer list including the MAC address of the newly authenticated host to the existing authenticated host. For example, the communication controller 20 may transmit the MAC address of the second host 60 to the earlier authenticated first host 50. Additionally, when authentication of at least one third host (not shown) is succeeded (S16), the communication controller 20 may store the MAC address of the third host in the policy database 202 (S17), and transmit the MAC address of the third host to the first host 50 and the second host 60 (S18).

Figure 5:
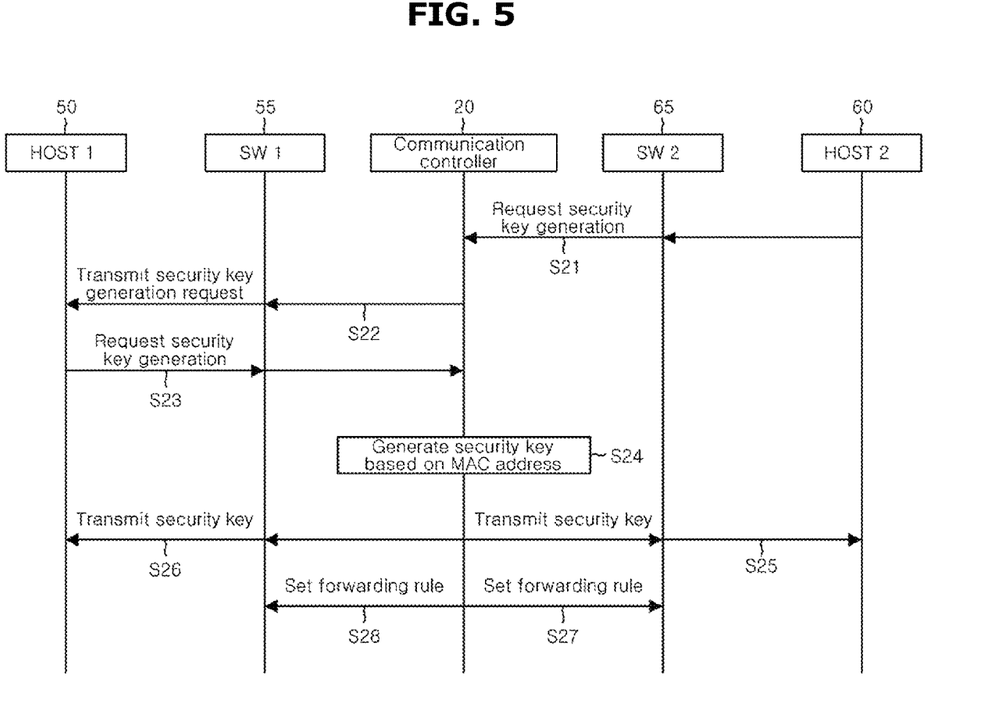
FIG. 5 is a flowchart showing each step of a security key generation process by a communication controller in an end-to-end security communication method according to an embodiment of the present disclosure.

FIG. 5 is a flowchart showing each step of the security key generation process by the communication controller in the end-to-end security communication method according to an embodiment of the present disclosure.

Referring to FIG. 5, when the second host 60 having received the MAC address of the first host 50 by the process described above with reference to FIG. 4 intends to establish a security key for MAC security communication with the first host 50, the second host 60 may transmit a security key generation request packet to the communication controller 20 (S21). For example, the security key generation request packet may be an Encapsulation over LAN (EAPOL)-MACsec Key Agreement (MKA) packet defined in IEEE 802.1X standard. In this instance, as the second host 60 has the MAC address of the first host 50 received with the success packet of authentication, the second host 60 may generate the EAPOL-MKA packet including the MAC address of the first host 50 with which the second host 60 intends to establish a security key and information of the second host 60 and transmit it to the communication controller 20.

The transmission of the security key generation request packet from the second host 60 may be performed through the second switch 65 corresponding to the second host 60, and this is the same case with transmission and reception of other packet transmitted and received to/from the first host 50 and/or the second host 60.

The communication controller 20 having received the EAPOL-MKA packet requesting security key generation from the second host 60 transmits it to the first host 50 (S22). When the first host 50 having received the security key generation request packet agrees to establish a security key with the second host 60, likewise, the first host 50 transmits the EAPOL-MKA packet requesting security key generation to the communication controller 20 (S23). In the same way as the foregoing in relation to the second switch 65, transmission and reception of the data packet to/from the first host 50 may be performed through the first switch 55 corresponding to the first host 50.

When the communication controller 20 transmits the EAPOL-MKA packet of the second host 60 to the first host 50 and then also receives the EAPOL-MKA packet from the first host 50 (S23), the communication controller 20 may generate a security key for sharing between the first host 50 and the second host 60 (S24). As the communication controller 20 stores the information and MAC addresses of each of the first host 50 and the second host 60, the communication controller 20 may generate a Secure Association Key (SAK) that will act as a security of MAC security communication between the first host 50 and the second host 60 as the security key.

In an embodiment, in addition to the SAK corresponding to the security key, the communication controller 20 further generates a Connectivity Association Key (CAK). The CAK is a master security key for authenticating that the security key has been authenticated by the IEEE 802.1X framework and is for use in network, and is stored by the communication controller 20.

Subsequently, the generated security key SAK is transmitted to each of the first host 50 and the second host 60 by the communication controller 20 (S25, S26). The first host 50 and the second host 60 encrypt the data packet using the security key received by the communication controller 20 and transmit the data packet destined for the other party, so that they can communicate each other based on MAC communication security technology.

In this instance, to accomplish normal transmission of the encrypted data packet between the first host 50 and the second host 60, the communication controller 20 sets forwarding rules to the first switch 55 and the second switch 65 connected respectively to the first host 50 and the second host 60 (S27, S28). The forwarding rule allows the data packet encrypted and transmitted based on the security key shared between the first host 50 and the second host 60 to be directly transmitted between the first host 50 and the second host 60, thereby excluding an additional encryption or decryption process for communication with other nodes.

Specifically, the communication controller 20 may set the forwarding rule of the first switch 55 to forward a packet whose source is the MAC address of the first host 50 and destination is the MAC address of the second host 60 directly to the second switch 65. Likewise, the communication controller 20 may set the forwarding rule of the second switch 65 to forward a packet whose source is the MAC address of the second host 60 and destination is the MAC address of the first host 50 directly to the first switch 55.

Accordingly, as opposed to the conventional MAC security communication, in transmitting the packet based on the MAC address between the first host 50 and the second host 60, there is no need for an encryption and decryption process of the data packet by additional nodes.

Figure 6:
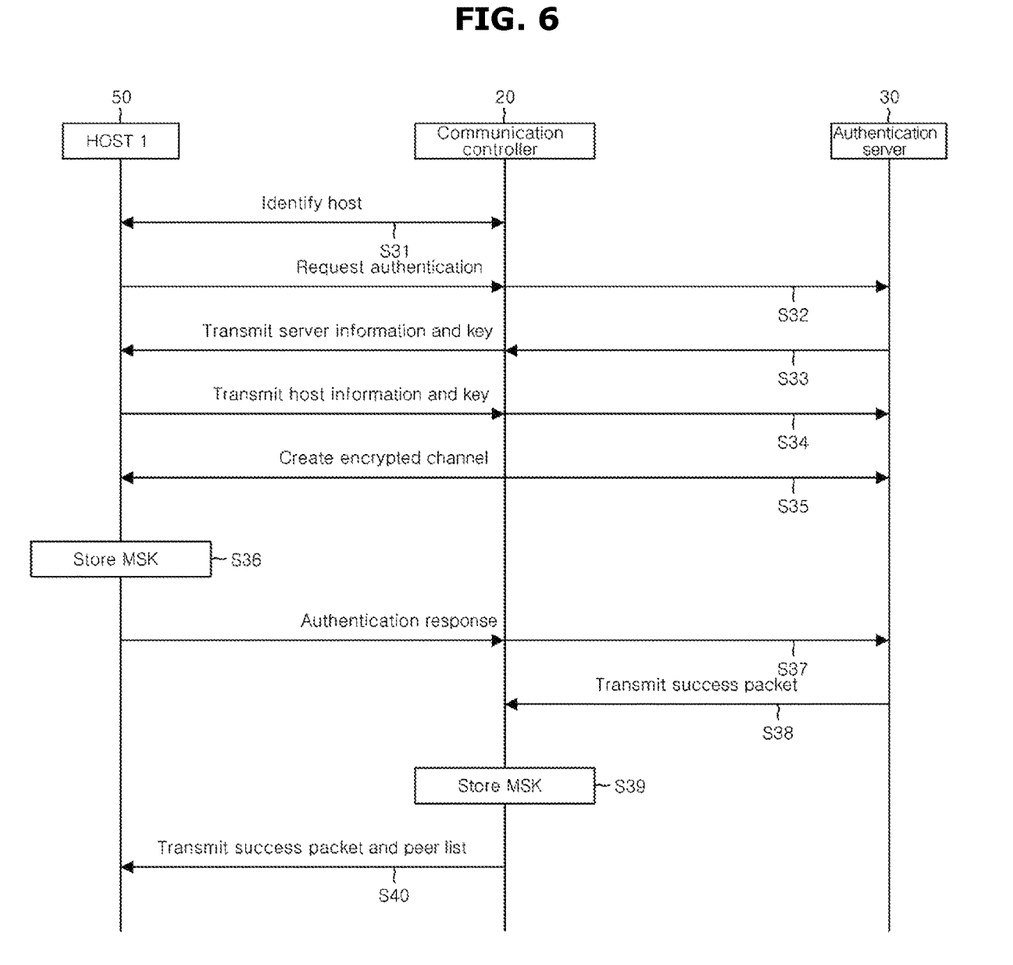
FIG. 6 is a flowchart showing each step of an authentication process through an authentication server in an end-to-end security communication method according to an embodiment of the present disclosure.

FIG. 6 is a flowchart showing each step of the authentication process through the authentication server in the end-to-end security communication method according to an embodiment of the present disclosure.

Referring to FIG. 6, the communication controller 20 may identify the first host 50 that can communicate with the communication controller 20 (S31). The identification process may be performed through a response of the first host 50 to an identification request from the communication controller 20, and the identification request and response may include a data packet based on Extensible Authentication Protocol (EAPOL-EAP).

The identification may be followed by handshake for communication parameter settings between the authentication server 30 and the first host 50 through the communication protocol 20, and the first host 50 may transmit an authentication request to the authentication server 30 (S32). The authentication request may include an EAP protocol based packet.

The authentication server 30 having received the authentication request may transmit server information and a server key of the authentication server 30 to the first host 50 in the form of EAPOL-EAP data packet (S33). Additionally, the first host 50 having received the server information and the server key may verify the validity of the server information and the key, and when they are determined to be valid, transmit information and a client key of the first host 50 to the authentication server 30 in the form of EAPOL-EAP data packet (34). In this instance, the transmitted EAPOL-EAP data packet may include change information of Cipher spec.

Subsequently, the first host 50 and the authentication server 30 may achieve Transport Layer Security (TLS) based on the change information of Cipher spec, and create an encrypted channel between the first host 50 and the authentication server 30 (S35).

After the encrypted channel is created, the first host 50 may store a Master Session Key (MSK) received through the encrypted channel (S36). Additionally, the first host 50 may transmit an authentication response to the authentication server 30 (S37). The authentication response may include a data packet based on Protected Extensible Authentication Protocol (EAP-PEAP) defined in EAPOL-EAP protocol.

When receiving the authentication response, the authentication server 30 may transmit a success packet of authentication to the communication controller 20 (S38). The communication controller 20 stores the MSK received from the authentication server 30 in the policy database 202 of the communication controller 20, and transmits the success packet representing authentication success to the first host 50 (S40). In this instance, for MAC security communication using SDK, the communication controller 20 may transmit a peer list including MAC addresses of other hosts capable of communication on the network to the first host 50 together with the success packet as described above.

Although FIG. 6 describes the authentication procedure of the first host 50 for convenience of description, it will be easily understood by those skilled in the art that the same authentication procedure may be equally applied to the authentication process of the second host 60 or one or more other additional host.

The above-described end-to-end security communication method may be implemented as an application or in the form of program commands that are executed through various computer components, and recorded in computer-readable recording media. The computer-readable recording media may include program commands, data files and data structures, alone or in combination.

The program commands in recorded in the computer-readable recording media may be specially designed and configured for the present disclosure, and may be known and available to those having ordinary skill in the field of computer software.

Examples of the computer-readable recording media include hardware devices specially designed to store and execute program commands, such as magnetic media such as hard disk, floppy disk and magnetic tape, optical recording media such as CD-ROM and DVD, magneto-optical media such as floptical disk, and ROM, RAM and flash memory.

Examples of the program commands include machine codes generated by a compiler as well as high-level language codes that can be executed by a computer using an interpreter. The hardware device may be configured to act as one or more software modules to perform processing according to the present disclosure, or vice versa.

While the present disclosure has been hereinabove described with reference to the embodiments, it will be apparent to those skilled in the corresponding technical field that a variety of modifications and changes may be made thereto without departing from the spirit and scope of the present disclosure set forth in the appended claims.

DETAILED DESCRIPTION OF MAIN ELEMENTS

100: Network analyzer
101, 102, 50, 60: Host
103, 104, 105, 55, 65: Switch
20: Communication controller
201: Authentication unit
202: Policy database
203: Key generation unit
204: Forwarding rule generation unit
30: Authentication server
40: Router

What is claimed is:

1. An end-to-end security communication method, the method performed by a communication controller comprising the steps of:

receiving an authentication request of a first host from the first host, and performing an authentication of the first host by communicating with an authentication server;

receiving an authentication request of a second host from the second host and performing an authentication of the second host by communicating with the authentication server;

transmitting a success packet and the MAC address of the first host to the second host when the authentication of the second host is succeeded;

receiving a first security key generation request packet including a Media Access Control (MAC) address of the first host from the second host;

transmitting the first security key generation request packet to the first host;

generating, by the communication controller, a security key for end-to-end security communication between the first host and the second host when a second security key generation request packet including a MAC address of the second is received receiving the security key generation request packet from the first host;

transmitting the generated security key to each of the first host and the second host; and setting a forwarding rule for transmission of a packet destined for the MAC address of the first host or the MAC address of the second host to a first switch and a second switch connected respectively to the first host and the second host.

2. The end-to-end security communication method according to claim 1, further comprising:

performing, by the communication controller, authentication of at least one third host; and transmitting, by the communication controller, a MAC address of the third host to each of the first host and the second host when authentication of the third host is succeeded.

3. The end-to-end security communication method according to claim 2, wherein the setting the forwarding rule comprises setting, by the communication controller, the forwarding rule of the first switch to transmit a packet whose source is the MAC address of the first host and destination is the MAC address of the second host directly to the second switch.

4. The end-to-end security communication method according to claim 2, wherein the setting the forwarding rule comprises setting, by the communication controller, the forwarding rule of the second switch to transmit a packet whose source is the MAC address of the second host and destination is the MAC address of the first host directly to the first switch.

5. A communication controller, comprising:
an authentication unit configured to
receive, from a first host, an authentication request of the first host and perform authentication of at least one host the first host by communicating with an authentication server, and
receive, from a second host, an authentication request of the second host and perform an authentication of the second host by communicating with the authentication server;
transmitting, by the communication controller, a success packet and the MAC address of the first host to the second host when the authentication of the second host is succeeded;
a policy database which stores an each Media Access Control (MAC) address of the first and second hosts authenticated by the authentication unit;
a key generation unit configured to
receive a first security key generation request packet including a MAC address of the first host from the second host, transmit the first security key generation request packet to the first host, and
generate a security key for end-to-end security communication between the first host and the second host and transmit the generated security key to each of the first host and the second host when a second security key generation request packet including a MAC address of the second is received from the first host; and
a forwarding rule setting unit configured to set a forwarding rule for transmission of a packet destined for the MAC address of the first host or the MAC address of the second host to a first switch and a second switch connected respectively to the first host and the second host.

6. The communication controller according to claim 5, wherein
the policy database includes the MAC address of the first host, and
the authentication unit is further configured to receive an authentication request of the second host, and transmit a success packet and the MAC address of the first host to the second host when authentication of the second host is succeeded.

7. The communication controller according to claim 5, wherein the authentication unit is further configured to perform authentication of at least one third host, and transmit a MAC address of the third host to each of the first host and the second host when authentication of the third host is succeeded.

8. The communication controller according to claim 5, wherein the forwarding rule setting unit sets the forwarding rule of the first switch to transmit a packet whose source is the MAC address of the first host and destination is the MAC address of the second host directly to the second switch.

9. The communication controller according to claim 5, wherein the forwarding rule setting unit sets the forwarding rule of the second switch to transmit a packet whose source is the MAC address of the second host and destination is the MAC address of the first host directly to the first switch.

10. A computer program stored on a non-transitory computer-readable recording medium to perform, in combination with a communication controller, an end-to-end security communication method, the method comprising:
receiving an authentication request of a first host from the first host, and performing authentication of the first host by communicating with an authentication server,
receiving an authentication request of a second host from the second host and performing an authentication of the second host by communicating with the authentication server;
transmitting a success packet and the MAC address of the first host to the second host when the authentication of the second host is succeeded;
receiving a first security key generation request packet including a Media Access Control (MAC) address of the first host from the second host;
transmitting the first security key generation request packet to the first host;
generating a security key for end-to-end security communication between the first host and the second host when a second security key generation request packet including a MAC address of the second is received from the first host;
transmitting the generated security key to each of the first host and the second host; and
setting a forwarding rule for transmission of a packet destined for the MAC address the first host or the MAC address of the second host to a first switch and a second switch connected respectively to the first host and the second host.

* * * * *